US012795468B2

(12) United States Patent
Gursu et al.

(10) Patent No.: US 12,795,468 B2
(45) Date of Patent: Nov. 10, 2026

(54) DELTA CONFIGURATION FOR CONDITIONAL HANDOVER CONFIGURATIONS

(71) Applicant: Nokia Technologies Oy, Espoo (FI)

(72) Inventors: Halit Murat Gursu, Munich (DE); Frederic Ratovelomanana, Massy (FR); Behnam Khodapanah, Munich (DE); Umur Karabulut, Munich (DE); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 276 days.

(21) Appl. No.: 18/624,821

(22) Filed: Apr. 2, 2024

(65) Prior Publication Data

US 2024/0340712 A1 Oct. 10, 2024

Related U.S. Application Data

(60) Provisional application No. 63/494,543, filed on Apr. 6, 2023.

(51) Int. Cl.
*H04W 36/00* (2009.01)
*H04W 36/36* (2009.01)

(52) U.S. Cl.
CPC ... *H04W 36/0061* (2013.01); *H04W 36/0069* (2018.08); *H04W 36/00835* (2018.08); *H04W 36/362* (2023.05)

(58) Field of Classification Search
CPC ......... H04W 36/0061; H04W 36/0069; H04W 36/00835; H04W 36/362; H04W 76/15
See application file for complete search history.

(56) References Cited

U.S. PATENT DOCUMENTS 10,952,117 B2 * 3/2021 Kim .................. H04W 36/0061
2020/0351744 A1 * 11/2020 Latheef ................. H04W 24/08
2021/0051550 A1 * 2/2021 Latheef ............... H04L 41/0816
2022/0279403 A1 * 9/2022 Yang ................. H04W 36/0085
(Continued)

FOREIGN PATENT DOCUMENTS

WO 2024/027973 A1 2/2024

OTHER PUBLICATIONS

Extended European Search Report received for corresponding European Patent Application No. 24167988.5, dated Sep. 2, 2024, 10 pages.
(Continued)

*Primary Examiner* — Md K Talukder
(74) *Attorney, Agent, or Firm* — ALSTON & BIRD LLP

(57) ABSTRACT

An apparatus, method, and computer program product are provided. In the context of a method, the method receives a conditional handover request. The method determines a plurality of configurations, wherein the plurality of configurations correspond to a single primary cell configuration. The method generates a first conditional handover configuration based on one of the plurality of configurations. The method generates one or more other conditional handover configurations as deltas with regards to the first conditional handover configuration, wherein the first conditional handover configuration and the one or more other conditional handover configurations comprise the plurality of configurations.

20 Claims, 6 Drawing Sheets

(56) References Cited

U.S. PATENT DOCUMENTS

| | | | | |
|---|---|---|---|---|
| 2023/0007550 A1* | 1/2023 | Kumar | ............ | H04W 36/00692 |
| 2023/0059975 A1* | 2/2023 | Wu | ................... | H04W 36/0079 |
| 2023/0209425 A1* | 6/2023 | Da Silva | ............... | H04W 36/08 370/331 |
| 2024/0340712 A1* | 10/2024 | Gursu | ............... | H04W 36/0061 |

OTHER PUBLICATIONS

"CHO with multiple candidate SCGs", 3GPP TSG-RAN WG3 Meeting #119, R3-230109, Agenda item: 14.3, Qualcomm Incorporated, Feb. 27-Mar. 3, 2023, 5 pages.
"CHO with target MCG and candidate SCG", 3GPP TSG-RAN#119e, R2-2207696, Agenda item: 8.4.4, Lenovo, Aug. 2022, 2 pages.
"Discussion on CHO with candidate SCGs", 3GPP TSG-RAN WG2 Meeting #121, R2-2301219, Agenda item: 8.4.4, ZTE Corporation, Feb. 27-Mar. 3, 2023, 8 pages.
"Consideration on support of CHO including target MCG and SCGs", 3GPP TSG RAN WG3#117-e, R3-224394, Agenda item: 14.3, China Telecom, Aug. 15-24, 2022, 5 pages.

* cited by examiner

DELTA CONFIGURATION FOR CONDITIONAL HANDOVER CONFIGURATIONS

TECHNOLOGICAL FIELD

An example embodiment relates generally to techniques for conditional handover and, more particularly, to techniques for reducing radio signaling and storing load during conditional handover.

BACKGROUND

User equipment often travels across wide geographical space. As user equipment moves, this can result in connection with multiple different master cell groups and secondary cell groups to provide coverage. As user equipment switches master cell groups and secondary groups, it switches primary cells (PCells) and primary cells of secondary cell groups (PSCells). User equipment will switch between these cells with conditional handover, and user equipment will often receive a number of configurations associated with these cells.

One approach used in conditional handover for user equipment is using separate conditional handover—new radio—dual connectivity configurations. A user may receive several of these configurations for the same target PCell, but associated with a plurality of different PSCells. For example, a user equipment may receive conditional handover (CHO) configuration 1 for target PCell 1 and target PSCell 1, CHO configuration 2 for target PCell 1 and target PSCell 2, and CHO configuration 3 for target PCell 1. In this situation, the user equipment receives three separate configurations for the same target Pcell (PCell 1). CHO configuration 1 includes the target PSCell 1 configuration, CHO configuration 2 includes the target PSCell 2 configuration, and CHO configuration 3 is a single connectivity configuration for target PCell 1. In this approach, the user equipment must execute one of the three configurations from scratch. This approach has inefficiencies in that it has a high signaling overhead. This can create large radio overhead and user equipment storage issues.

Another approach used to provide CHO configurations to user equipment is by using one CHO configuration for one target PCell with target PSCell configurations indicated as nested conditional PSCell addition/change (CPAC) configurations inside the CHO configuration. For example, CHO configuration 1 for target PCell 1 may include both conditional PSCell addition (CPA) 1 for target PSCell 1 and CPA 2 for Target PCell 2. In a case where a single connectivity configuration is needed, user equipment will not use the PSCell configurations included inside the CHO configuration. Under this approach, user equipment will execute a PCell configuration and will execute the CPA on top of that. Under this approach, there is less simplicity and more complication, resulting in inefficiency.

In some cases, the target PCell configuration can be signaled as a delta of a source PCell configuration, where the delta indicates a difference from the source PCell configuration. However, this still results in the same delta configuration being signaled to the user equipment multiple times. The issue of redundant signaling of the same PCell or MCG configurations persists in resulting in large radio overhead and user equipment storage issues.

In some cases, a baseline configuration can be used for target PSCell or SCG configurations. However, this doesn't solve the problem of redundant MCG/PCell signaling and does not solve the problem of signaling the same PSCell at the same time.

BRIEF SUMMARY

A method, apparatus, and computer program product are disclosed for delta configurations of conditional handover configurations. By using delta configurations in conditional handover, overhead is reduced.

In an example embodiment, a method is provided that comprises receiving a conditional handover request. The method further comprises determining a plurality of configurations, wherein the plurality of configurations correspond to a single primary cell configuration. The method further comprises generating a first conditional handover configuration based on one of the plurality of configurations. The method further comprises generating one or more other conditional handover configurations as deltas with regards to the first conditional handover configuration, wherein the first conditional handover configuration and the one or more other conditional handover configurations comprise the plurality of configurations.

In an example embodiment, the plurality of configurations comprise a plurality of master cell group configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

The method of an example embodiment further comprises causing transmission of a conditional handover request acknowledgement, wherein the conditional handover request acknowledgement comprises the first conditional handover configuration, the one or more other conditional handover configurations, and an indication that the one or more other conditional handover configurations comprise deltas with regards to the first conditional handover configuration.

The method of an example embodiment further comprises changing the first conditional handover configuration. The method further comprises, based on the change, changing the one or more other conditional handover configurations.

In an example embodiment, a method is provided comprising receiving a reconfiguration message, wherein the reconfiguration message comprises a first conditional handover configuration, one or more other conditional handover configurations, and an indication that the one or more other conditional handover configurations comprise deltas with regards to the first conditional handover configuration. The causing transmission of a reconfiguration confirmation based on the reconfiguration message.

The method of an example embodiment further comprises, in a circumstance where an execution condition corresponding to one of the one or more other conditional handover configurations holds, applying the one of the one or more other conditional handover configurations, wherein a second conditional handover configuration is generated on top of the first conditional handover configuration based on the one of the one or more other conditional handover configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, a method is provided that comprises causing transmission of a conditional handover request. The method further comprises receiving a conditional handover request acknowledgement, wherein the conditional handover request acknowledgement comprises a first conditional handover configuration, one or more other conditional handover configurations, and an indication that the one or more other conditional handover configurations comprise deltas with regards to the first conditional handover configuration. The method further comprises causing transmission of a reconfiguration message, wherein the reconfiguration message comprises the first conditional handover configuration, the one or more other conditional handover configurations, and the indication that the one or more other conditional handover configurations comprise deltas with regards to the first conditional handover configuration.

The method of an example embodiment further comprises receiving a reconfiguration confirmation based on the reconfiguration message.

The method of an example embodiment further comprises removing an execution condition for at least one conditional handover configuration of the first conditional handover configuration and the one or more other conditional handover configurations.

The method of an example embodiment further comprises storing a master cell group configuration associated with the first conditional handover configuration.

The method of an example embodiment further comprises causing transmission of an indication to release the first conditional handover configuration.

The method of an example embodiment further comprises causing transmission of an indication to release the first conditional handover configuration. The method further comprises causing transmission of a message comprising a master cell group configuration and an indication that the one or more other conditional handover configurations comprise deltas with regards to the master cell group configuration.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, an apparatus is provided that comprises at least one processor and at least one memory including computer program code configured to, with the at least one processor, cause the apparatus at least to receive a conditional handover request. The at least one memory and the computer program code are further configured to determine a plurality of configurations, wherein the plurality of configurations correspond to a single primary cell configuration. The at least one memory and the computer program code are further configured to generate a first conditional handover configuration based on one of the plurality of configurations. The at least one memory and the computer program code are further configured to generate one or more other conditional handover configurations as deltas with regards to the first conditional handover configuration, wherein the first conditional handover configuration and the one or more other conditional handover configurations comprise the plurality of configurations.

In an example embodiment, the plurality of configurations comprise a plurality of master cell group configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, the at least one memory and the computer program code are further configured to, with the at least one processor, cause the apparatus to cause transmission of a conditional handover request acknowledgement, wherein the conditional handover request acknowledgement comprises the first conditional handover configuration, the one or more other conditional handover configurations, and an indication that the one or more other conditional handover configurations comprise deltas with regards to the first conditional handover configuration.

In an example embodiment, the at least one memory and the computer program code are further configured to, with the at least one processor, cause the apparatus to change the first conditional handover configuration. The at least one memory and the computer program code are further configured to, with the at least one processor, cause the apparatus to based on the change, changing the one or more other conditional handover configurations.

In an example embodiment, an apparatus is provided that comprises at least one processor and at least one memory including computer program code with the at least one memory and the computer program code configured to, with the at least one processor, receive a reconfiguration message, wherein the reconfiguration message comprises a first conditional handover configuration, one or more other conditional handover configurations, and an indication that the one or more other conditional handover configurations comprise deltas with regards to the first conditional handover configuration. The at least one memory and the computer program code are further configured to, with the at least one processor, cause the apparatus to cause transmission of a reconfiguration confirmation based on the reconfiguration message.

In an example embodiment, the at least one memory and the computer program code are further configured to, with the at least one processor, cause the apparatus to, in a circumstance where an execution condition corresponding to one of the one or more other conditional handover configurations holds, apply the one of the one or more other conditional handover configurations, wherein a second conditional handover configuration is generated on top of the first conditional handover configuration based on the one of the one or more other conditional handover configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, an apparatus is provided that comprises at least one processor and at least one memory including computer program code with the at least one memory and the computer program code configured to, with the at least one processor, cause the apparatus at least to cause transmission of a conditional handover request. The at least one memory and the computer program code are further configured to, with the at least one processor, receive a conditional handover request acknowledgement, wherein the conditional handover request acknowledgement comprises a first conditional handover configuration, one or more other conditional handover configurations, and an indication that the one or more other conditional handover configurations comprise deltas with regards to the first conditional handover configuration. The at least one memory and the computer program code are further configured to, with the at least one processor, cause transmission of a reconfiguration message, wherein the reconfiguration message comprises the first conditional handover configuration, the one or more other conditional handover configurations, and the indication that the one or more other conditional handover configurations comprise deltas with regards to the first conditional handover configuration.

In an example embodiment, the at least one memory and the computer program code are further configured to, with the at least one processor, cause the apparatus to receive a reconfiguration confirmation based on the reconfiguration message.

In an example embodiment, the at least one memory and the computer program code are further configured to, with the at least one processor, cause the apparatus to remove an execution condition for at least one conditional handover configuration of the first conditional handover configuration and the one or more other conditional handover configurations.

In an example embodiment, the at least one memory and the computer program code are further configured to, with the at least one processor, cause the apparatus to store a master cell group configuration associated with the first conditional handover configuration. The at least one memory and the computer program code are further configured to, with the at least one processor, cause the apparatus to cause transmission of an indication to release the first conditional handover configuration.

In an example embodiment, the at least one memory and the computer program code are further configured to, with the at least one processor, cause the apparatus to cause transmission of an indication to release the first conditional handover configuration. The at least one memory and the computer program code are further configured to, with the at least one processor, cause the apparatus to cause transmission of a message comprising a master cell group configuration and an indication that the one or more other conditional handover configurations comprise deltas with regards to the master cell group configuration.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, a non-transitory computer readable storage medium comprising computer instructions that, when executed by an apparatus, cause the apparatus to receive a conditional handover request. The non-transitory computer readable storage medium further includes computer instructions configured, upon execution, to determine a plurality of configurations, wherein the plurality of configurations correspond to a single primary cell configuration. The non-transitory computer readable storage medium further includes computer instructions configured, upon execution, to generate a first conditional handover configuration based on one of the plurality of configurations. The non-transitory computer readable storage medium further includes computer instructions configured, upon execution, to generate one or more other conditional handover configurations as deltas with regards to the first conditional handover configuration, wherein the first conditional handover configuration and the one or more other conditional handover configurations comprise the plurality of configurations.

In an example embodiment, the plurality of configurations comprise a plurality of master cell group configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

The non-transitory computer readable storage medium of an example embodiment further includes computer instructions configured, upon execution, to cause transmission of a conditional handover request acknowledgement, wherein the conditional handover request acknowledgement comprises the first conditional handover configuration, the one or more other conditional handover configurations, and an indication that the one or more other conditional handover configurations comprise deltas with regards to the first conditional handover configuration.

The non-transitory computer readable storage medium of an example embodiment further includes computer instructions configured, upon execution, to change the first conditional handover configuration. The non-transitory computer readable storage medium further includes computer instructions configured, upon execution, to, based on the change, change the one or more other conditional handover configurations.

In an example embodiment, a non-transitory computer readable storage medium is provided comprising computer instructions that, when executed by an apparatus, cause the apparatus to receive a reconfiguration message, wherein the reconfiguration message comprises a first conditional handover configuration, one or more other conditional handover configurations, and an indication that the one or more other conditional handover configurations comprise deltas with regards to the first conditional handover configuration. The non-transitory computer readable storage medium further includes computer instructions configured, upon execution, to cause transmission of a reconfiguration confirmation based on the reconfiguration message.

The non-transitory computer readable storage medium of an example embodiment further includes computer instructions configured, upon execution, to in a circumstance where an execution condition corresponding to one of the one or more other conditional handover configurations holds, applying the one of the one or more other conditional handover configurations, wherein a second conditional handover configuration is generated on top of the first conditional handover configuration based on the one of the one or more other conditional handover configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, a non-transitory computer readable storage medium is provided comprising computer instructions that, when executed by an apparatus, cause the apparatus to cause transmission of a conditional handover request. The non-transitory computer readable storage medium further includes computer instructions configured, upon execution, to receive a conditional handover request acknowledgement, wherein the conditional handover request acknowledgement comprises a first conditional handover configuration, one or more other conditional handover configurations, and an indication that the one or more other conditional handover configurations comprise deltas with regards to the first conditional handover configuration. The non-transitory computer readable storage medium further includes computer instructions configured, upon execution, to cause transmission of a reconfiguration message, wherein the reconfiguration message comprises the first conditional handover configuration, the one or more other conditional handover configurations, and the indication that the one or more other conditional handover configurations comprise deltas with regards to the first conditional handover configuration.

The non-transitory computer readable storage medium of an example embodiment further includes computer instructions configured, upon execution, to receive a reconfiguration confirmation based on the reconfiguration message.

The non-transitory computer readable storage medium of an example embodiment further includes computer instructions configured, upon execution, to remove an execution condition for at least one conditional handover configuration of the first conditional handover configuration and the one or more other conditional handover configurations.

The non-transitory computer readable storage medium of an example embodiment further includes computer instructions configured, upon execution, to store a master cell group configuration associated with the first conditional handover configuration. The non-transitory computer readable storage medium further includes computer instructions configured, upon execution, to cause transmission of an indication to release the first conditional handover configuration.

The non-transitory computer readable storage medium of an example embodiment further includes computer instructions configured, upon execution, to cause transmission of an indication to release the first conditional handover configuration. The non-transitory computer readable storage medium further includes computer instructions configured, upon execution, to cause transmission of a message comprising a master cell group configuration and an indication that the one or more other conditional handover configurations comprise deltas with regards to the master cell group configuration.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, an apparatus is provided comprising means for receiving a conditional handover request. The apparatus further comprises means for determining a plurality of configurations, wherein the plurality of configurations correspond to a single primary cell configuration. The apparatus further comprises means for generating a first conditional handover configuration based on one of the plurality of configurations. The apparatus further comprises means for generating one or more other conditional handover configurations as deltas with regards to the first conditional handover configuration, wherein the first conditional handover configuration and the one or more other conditional handover configurations comprise the plurality of configurations.

In an example embodiment, the plurality of configurations comprise a plurality of master cell group configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

The apparatus of an example embodiment further comprises means for causing transmission of a conditional handover request acknowledgement, wherein the conditional handover request acknowledgement comprises the first conditional handover configuration, the one or more other conditional handover configurations, and an indication that the one or more other conditional handover configurations comprise deltas with regards to the first conditional handover configuration.

The apparatus of an example embodiment further comprises means for changing the first conditional handover configuration. The apparatus further comprises means for, based on the change, changing the one or more other conditional handover configurations.

In an example embodiment, an apparatus is provided comprising means for receiving a reconfiguration message, wherein the reconfiguration message comprises a first conditional handover configuration, one or more other conditional handover configurations, and an indication that the one or more other conditional handover configurations comprise deltas with regards to the first conditional handover configuration. The apparatus of an example embodiment further comprises means for causing transmission of a reconfiguration confirmation based on the reconfiguration message.

The apparatus of an example embodiment further comprises means for, in a circumstance where an execution condition corresponding to one of the one or more other conditional handover configurations holds, applying the one of the one or more other conditional handover configurations, wherein a second conditional handover configuration is generated on top of the first conditional handover configuration based on the one of the one or more other conditional handover configurations.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

In an example embodiment, an apparatus is provided comprising means for causing transmission of a conditional handover request. The apparatus further comprises means for receiving a conditional handover request acknowledgement, wherein the conditional handover request acknowledgement comprises a first conditional handover configuration, one or more other conditional handover configurations, and an indication that the one or more other conditional handover configurations comprise deltas with regards to the first conditional handover configuration. The apparatus further comprises means for causing transmission of a reconfiguration message, wherein the reconfiguration message comprises the first conditional handover configuration, the one or more other conditional handover configurations, and the indication that the one or more other conditional handover configurations comprise deltas with regards to the first conditional handover configuration.

The apparatus of an example embodiment further comprises means for receiving a reconfiguration confirmation based on the reconfiguration message.

The apparatus of an example embodiment further comprises means for removing an execution condition for at least one conditional handover configuration of the first conditional handover configuration and the one or more other conditional handover configurations.

The apparatus of an example embodiment further comprises means for storing a master cell group configuration associated with the first conditional handover configuration. The apparatus of an example embodiment further comprises means for causing transmission of an indication to release the first conditional handover configuration.

The apparatus of an example embodiment further comprises means for causing transmission of an indication to release the first conditional handover configuration. The apparatus further comprises means for causing transmission of a message comprising a master cell group configuration and an indication that the one or more other conditional handover configurations comprise deltas with regards to the master cell group configuration.

In an example embodiment, the first conditional handover configuration comprises a first master cell group configuration, and wherein the one or more other conditional handover configurations comprise one or more other master cell group configurations generated as one or more deltas with regards to the first master cell group configuration.

In an example embodiment, the first master cell group configuration comprises a delta configuration.

In an example embodiment, the first conditional handover configuration comprises a master cell group configuration and a secondary cell group configuration.

BRIEF DESCRIPTION OF THE DRAWINGS

Figure 1:
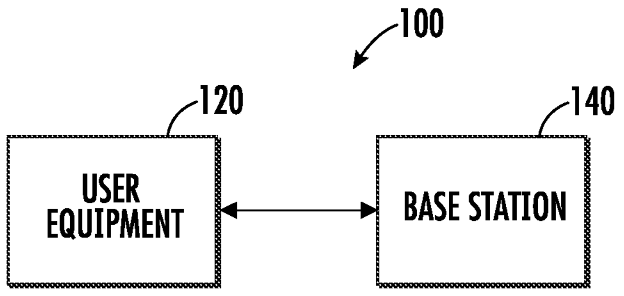
Figure 2:
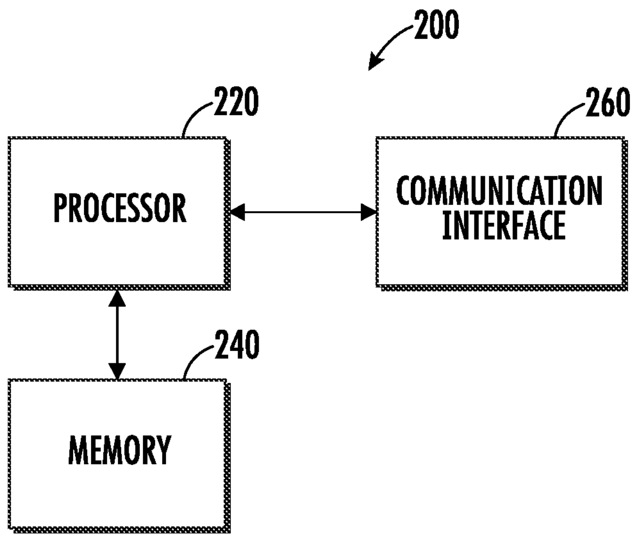
Figure 3:
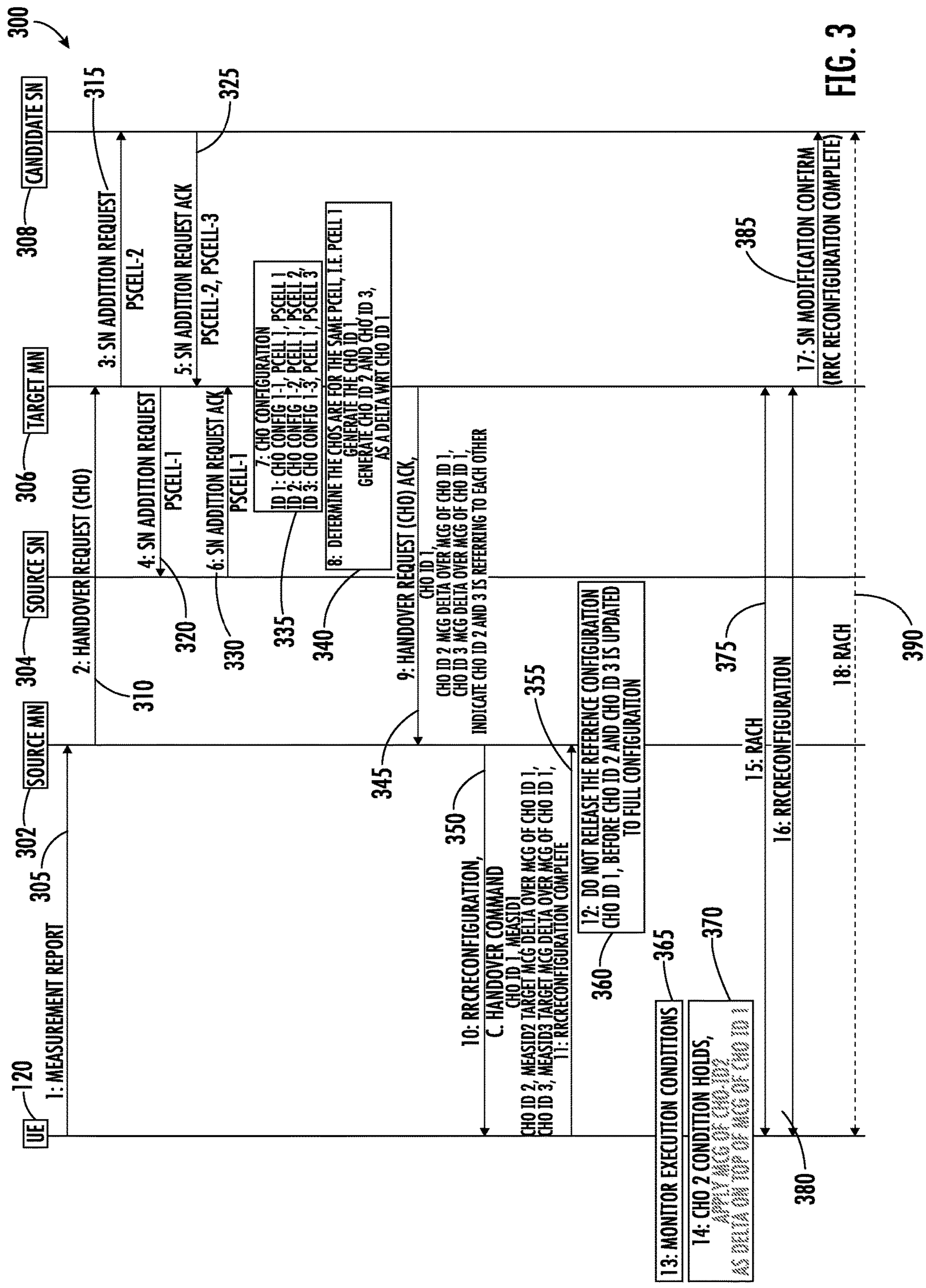
Figure 4:
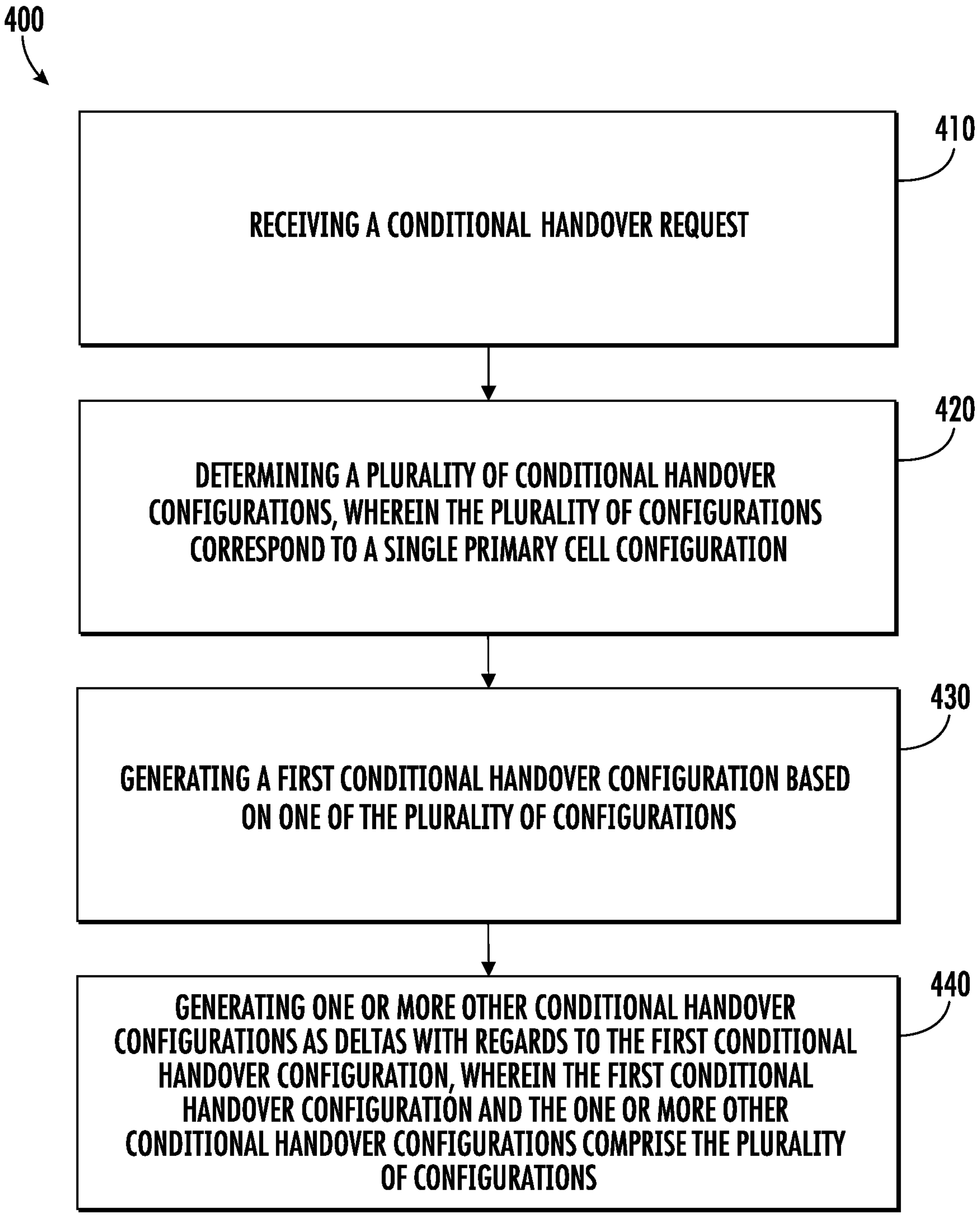
Figure 5:
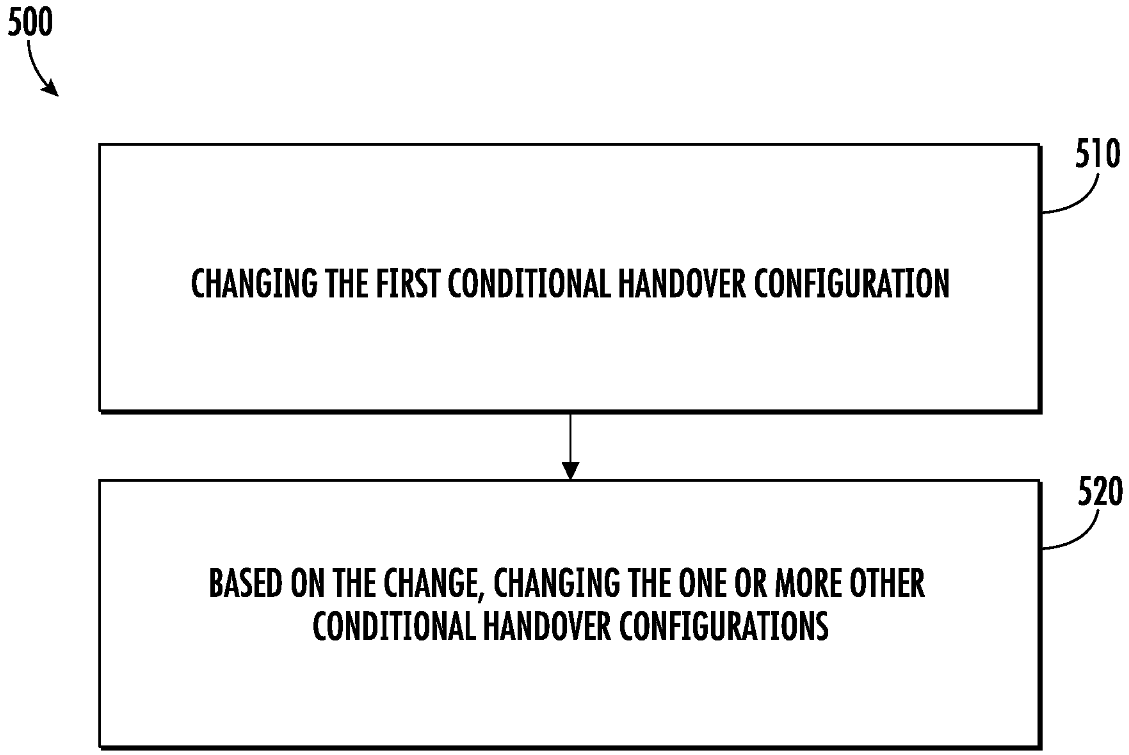
Figure 6:
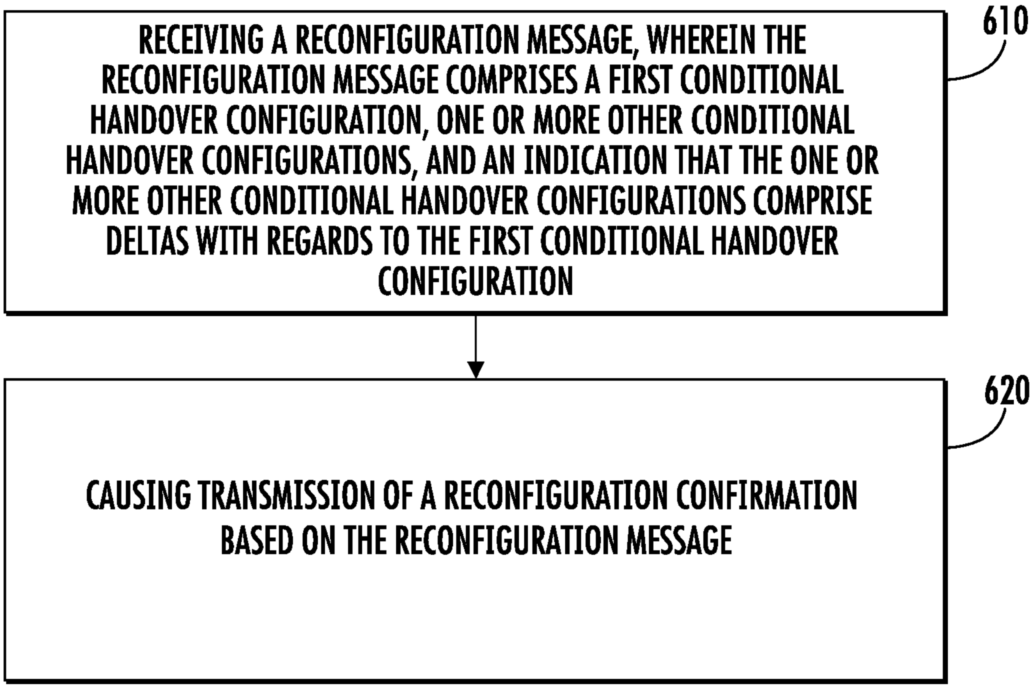

Having thus described certain example embodiments of the present disclosure in general terms, reference will hereinafter be made to the accompanying drawings, which are not necessarily drawn to scale, and wherein:

FIG. 1 is a block diagram of a system including both a base station and user equipment configured to communicate via at least uplink and downlink transmission in accordance with an example embodiment of the present disclosure;

FIG. 2 is a block diagram of an example communication system in which the system of FIG. 1 may be deployed in accordance with an example embodiment of the present disclosure;

FIG. 3 is a flow diagram demonstrating conditional handover using a delta configuration method in accordance with an example embodiment of the present disclosure;

FIG. 4 is a flowchart demonstrating operations performed, such as by the apparatus of FIG. 2, in order to generate one or more conditional handover IDs as deltas with regards to a first conditional handover ID, when the first conditional handover ID and the one or more other conditional handover IDs comprise a plurality of conditional handover configurations;

FIG. 5 is a flowchart demonstrating operations performed, such as by the apparatus of FIG. 2, in order to update one or more other conditional handover IDs based on an update;

FIG. 6 is a flowchart demonstrating operations performed, such as by the apparatus of FIG. 2, in order to cause transmission of a reconfiguration confirmation based on a reconfiguration message.

Figure 7:
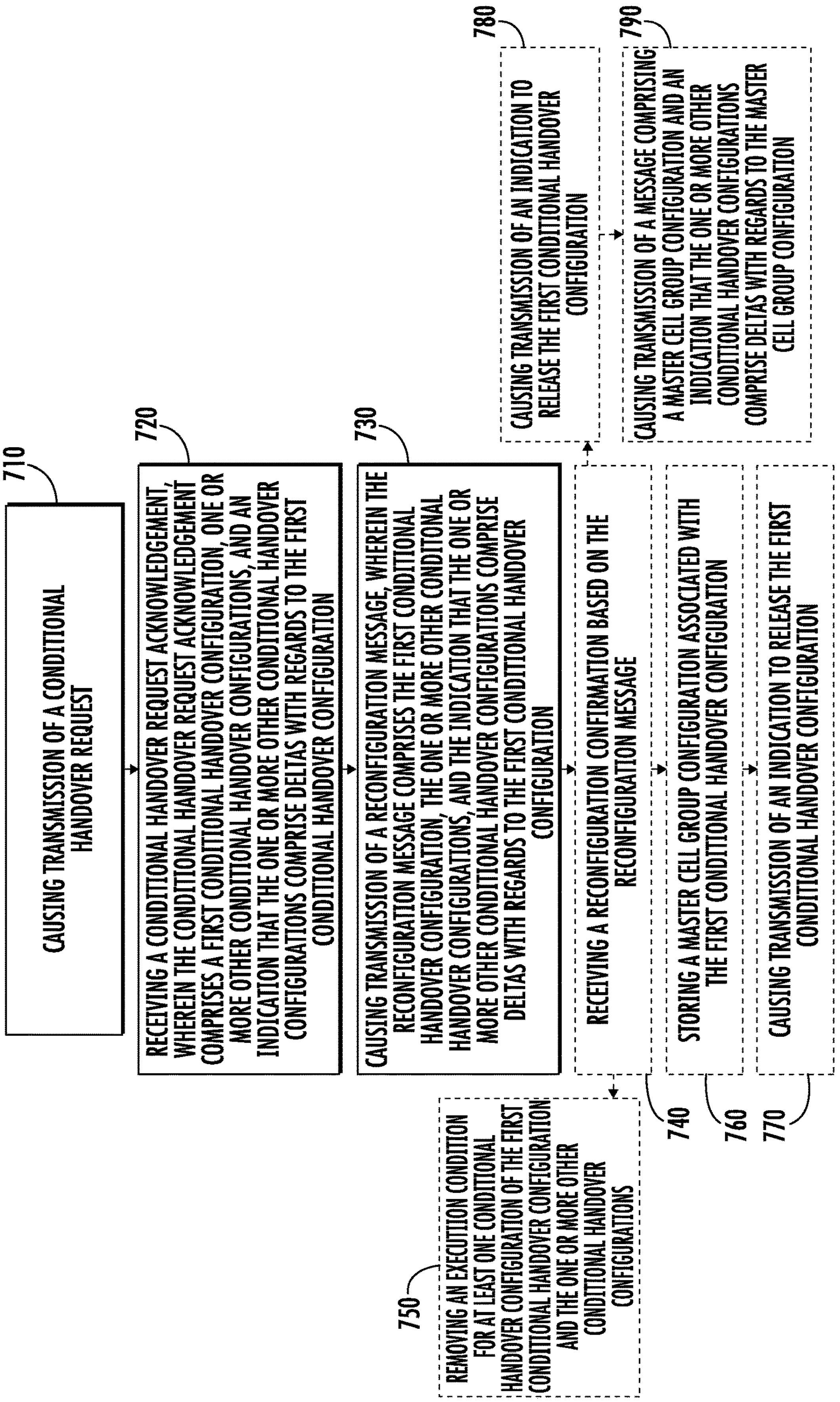

FIG. 7 is a flowchart demonstrating operations performed, such as by the apparatus of FIG. 2, in order to cause transmission of a reconfiguration message, where the reconfiguration message includes a first conditional handover ID, one or more other conditional handover IDs, and an indication that one or more other conditional handover IDs comprise deltas with regards to the first conditional handover ID

DETAILED DESCRIPTION

Some embodiments of the present disclosure will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As used herein, the term "computer-readable medium" refers to non-transitory storage hardware, non-transitory storage device or non-transitory computer system memory that may be accessed by a controller, a microcontroller, a computational system or a module of a computational system to encored thereon computer-executable instructions or software programs. A non-transitory "computer readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more universal synchronous bus (USB) flash drives), computer system memory or random-access memory (such as dynamic random access memory (DRAM), static random access memory (SRAM), extended data out random access memory (EDO RAM), and the like.

As illustrated in FIG. 1, a system 100 is provided in accordance with an example embodiment in order to facilitate uplink transmission from user equipment 120. Although the system may be configured in various manners, the system of one embodiment is depicted in FIG. 1 and includes both user equipment 120 and base station 140 configured to communicate via uplink and downlink transmission and reception beams. Although one user equipment and one base station is depicted, the system may include and the user equipment 120 and/or base station 140 may communicate with additional user equipment and base stations in other embodiments. In one or more embodiments, the user equipment 120 and base station 140 may configured to support, for example, 5G, 5G advanced, or 6G. In one or more embodiments, the system 100 may support carrier aggregation and/or dual connectivity. As described below, the system is configured to transmit messages and reports, such as reconfiguration messages, radio resource control messages, MAC control element messages, downlink control information messages, and/or the like.

The data that is transmitted via the uplink and downlink beams between the user equipment 120 and the base station 140 can be any of a wide variety of data including, but not limited to digital imagery data including video data, audio data as well as data provided by sensors, radars, telescopes and radio receivers. In at least some instances, the data is encoded prior to communication of the data via the uplink and downlink beams and decoded upon reception. The resulting data received may be utilized for a variety of purposes including presentation to a user, storage of the data for subsequent use and/or provision of the data to one or more applications, such as applications that perform statistical inference on the data for various purposes including object recognition, image classification, spectrum sensing, speech transcription and/or prediction or detection of events.

The user equipment 120 of FIG. 1 (also called UE, user device, user terminal, terminal device, etc.) illustrated one type of an apparatus which resources on an air interface are allocated and assigned. The user equipment 120 typically refers to a portable computing device that includes wireless mobile communication devices operating with or without a subscriber identification module (SIM), including, but not limited to, the following types of devices: a mobile station (mobile phone), smartphone, personal digital assistance (PDA), handset, device using a wireless modem (alarm or measurement device, etc.), laptop and/or touch screen computer, tablet, game console, notebook, and multimedia device. User equipment 120 may also be a device having capability to operate in Internet of Things (IoT) network which is a scenario in which objects are provided with the ability to transfer data over a network without requiring human-to-human or human-to-computer interaction. The user equipment 120 (or in some embodiments a layer 3 relay node) is configured to perform one or more of user equipment functionalities. The user equipment 120 may also be called a subscriber unit, mobile station, remote terminal, access terminal, user terminal, or user equipment (UE) just to mention but a few names or apparatuses. The user equipment 120 may operate in multi-radio duel connectivity.

The base station 140 of FIG. 1 may comprise, for example, remote radio heads (RRHs), transmission reception points (TRPs), access points, node Bs (e.g., gNB) or other transmission sources. The base station 140 may be configured to communicate with user equipment 120 via a network.

The base station 140 may operate as part of a cell group. Base station 140 may be part of a master cell group (MCG) or a secondary cell group (SCG). In one or more embodiments, base station 140 may operate as a primary cell in the MCG or SCG. In one or more embodiments, base station 140 may operate as a secondary cell in the MCG or SCG. In one or more alternate embodiments, user equipment 120 may move locations, necessitating a new MCG or SCG. In one or more embodiments, user equipment 120 may utilize selective activation of SCG or selective activation of MCG. In one or more embodiments, user equipment 120 moving cells may result in the previous source primary cell of secondary cell group (PSCell) changing to a target PSCell with conditional PSCell change. In one or more embodiments, user equipment 120 moving cells may result in the previous primary cell (PCell) changing to a target PCell. In one or more embodiments, user equipment may change master cell groups with conditional handover. In one or more embodiments, FIG. 2 depicts an example apparatus 200 that may be configured to function as user equipment 120 or base station 140. As shown in FIG. 2, the apparatus includes, is associated with, or is in communications with processing circuitry 220, a memory 240, and a communication interface 260. The processing circuitry 220 may be in communication with the memory device 240 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 200 may, in some embodiments, be embodied in various computing devices described as above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

The processing circuitry 220, also referenced as a processor, may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining, and/or multithreading.

In an example embodiment, the processing circuitry 220 may be configured to execute instructions stored in the memory device 240 or otherwise accessible to the processing circuitry. Alternatively or additionally, the processing circuitry may be configured to execute hardcoded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 260 may be any means such as a device or circuitry embodied in either hardware or a combination of hardware and software that is configured to receive and/or transmit data including media content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communications interface may alternatively or also support wired communication. As such, for example, the communication interface may include a communication modem and/or other hardware/software for supporting communication via cable, digital subscriber line (DSL), universal serial bus (USB) or other mechanisms.

Turning now to FIG. 3, a signaling diagram illustrates a process 300 for conditional handover using a delta configuration method in accordance with an example embodiment of the present disclosure. In this example embodiment, the user equipment 120 is connected to a source master node 302 and a source secondary node 304 and initiates conditional handover to target master node 306, with source secondary node 304 and candidate secondary node 308 providing target PSCells.

In one or more embodiments, the illustrated process uses the delta method to minimize radio signaling and user equipment storing load. In one or more embodiments, of the illustrated process, the target MCG configuration (or PCell configuration) can be configured as a delta on top of another target MCG configuration for the same cell.

In one or more embodiments, at operation 305, user equipment 120 transmits a measurement report to source master node 302.

In one or more embodiments, at operation 310, source master node 302 transmits a CHO request to target master node 306.

In one or more embodiments, at operation 315, the target master node 306 transmits a secondary node addition request to candidate secondary node 308. In one or more embodiments, the secondary node addition request identifies PSCell 2 as a target PSCell.

In one or more embodiments, at operation 320, the target master node 306 transmits a secondary node addition request to source secondary node 304. In one or more embodiments, source secondary node 304 is a candidate secondary node for target master node 306. In one or more embodiments, the secondary node addition request identifies PSCell 1 as a target PSCell.

In one or more embodiments, at operation 325, the candidate secondary node 308 transmits a secondary node addition request acknowledgement to target master node 306. In one or more embodiments, the secondary node addition request acknowledgement identifies PSCell 2 and PSCell 3 as target PSCells.

In one or more embodiments, at operation 330, source secondary node 304 transmits a secondary node addition request acknowledgement to target master node 306. In one or more embodiments, the secondary node addition request acknowledgement identifies PSCell 1 as a target PSCell.

In one or more embodiments, at operation 335, target master node 306 determines a plurality of CHO configurations based on the secondary node addition request acknowledgements. In one or more embodiments, the plurality of CHO configurations have the same PCell but different PSCells. In one or more embodiments, the master node 306 generates one or more CHO configurations as deltas with regards to one of the CHO configurations. In one or more embodiments, the master node 306 generates one or more MCG configurations within within one or more CHO configurations as deltas with regard to an MCG configuration in another CHO configuration. In one or more embodiments, the plurality of CHO configurations includes CHO configuration 1-1 for PCell 1 and PSCell 1, CHO configuration 1-2 for PCell 1 and PSCell 2, and CHO configuration 3 for PCell 1 and PSCell 3.

In one or more embodiments, at operation 340, the target master node 306 determines that the plurality of CHO configurations are for the same PCell, for example, PCell 1. In one or more embodiments, the target master node 306 generates CHO configuration 1 (CHO ID 1) based on CHO configuration 1-1. In one or more embodiments, the target master node 306 generates CHO configuration 2 (CHO ID 2) and CHO configuration 3 (CHO ID 3) as deltas with regards to CHO configuration 1. In one or more embodiments, CHO ID 1 is a full configuration comprising an MCG (PCell) configuration and an SCG (PSCell) configuration. In one or more embodiments, CHO ID 2 and CHO ID 3 are generated as deltas with respect to the target MCG configuration in CHO ID 1. In one or more embodiments, the MCG configurations within CHO ID 2 and CHO ID 3 are delta on top of the MCG configuration in CHO ID 1. In one or more embodiments, the MCG configuration in CHO ID 1 is a reference configuration for the delta MCG configurations in CHO ID 2 and CHO ID 3. In one or more embodiments, CHO ID 2 and CHO ID 3 comprise delta configurations. In one or more embodiments, CHO ID 2 and CHO ID 3 are delta configurations on top of a reference target MCG configuration of CHO ID 1. In one or more embodiments, in a circumstance where the delta between the delta configuration and the target confirmation is empty, this is indicated with a single flag indicating that the target MCG configuration can be used as is.

In one or more embodiments, the reference target MCG is a delta configuration. In one or more embodiments, the reference delta configuration may be a delta based on a source MCG configuration, a reference configuration, a serving MCG configuration at the time of the CHO configuration, or the like. In one or more embodiments, the delta configurations are delta configurations on top of the target delta configuration. In one or more embodiments where the delta between the delta configuration and the target configuration is empty, this is indicated with a single flag indicating that the reference target MCG can be used as is. In one or more embodiments where the target MCG configuration is a delta configuration, the full configuration can be achieved by first applying the delta target MCG configuration on the reference configuration (e.g., source MCG configuration) and then applying the delta configuration on top of the obtained configuration. In one or more embodiments where the reference target MCG configuration is updated due to an update on the reference configuration (e.g., source MCG configuration), the delta configurations are updated as well. In one or more embodiments where the reference configuration is released and the reference target MCG configuration is re-configured as a full configuration, the delta configuration remains the same. In one or more alternative embodiments where the reference configuration is released and the reference target MCG configuration is re-configured as a full configuration, the delta configurations are subject to delta configuration updates. In one or more embodiments, an indication is transmitted to user equipment 120 may the target master node 306 how to create the full configuration using the reference target MCG configuration.

In one or more embodiments, at operation 345, target master node 306 transmits a CHO request acknowledgment to source master node 302. In one or more embodiments, the CHO request acknowledgement contains the full configuration of one CHO configuration and the delta configuration with respect to the full CHO configuration in the other CHO configurations. For example, the CHO request acknowledgement may comprise a full CHO ID 1 configuration and the delta configurations in CHO ID 1 and CHO ID 3 with regards to CHO ID 1. In one or more embodiments, the CHO request acknowledgement comprises an indication that one or more CHO IDs (e.g., CHO ID 2 and CHO ID 3) are deltas on top of another CHO ID (e.g., CHO ID 1). In one or more embodiments, the CHO request acknowledgment comprises an indication that CHO ID 2 and CHO ID 3 are referring to each other.

In one or more embodiments, at operation 350, source master node 302 transmits a reconfiguration message to user equipment 120. In one or more embodiments, the reconfiguration message comprises a radio resource control configuration. In one or more embodiments, the reconfiguration message comprises a handover command. In one or more embodiments, the reconfiguration message comprises the CHO configurations (e.g., CHO ID 1, CHO ID 2, and CHO ID 3). In one or more embodiments, the reconfiguration message comprises one or more measurement IDs (e.g., MeasID1 for CHO ID 1, MeasID2 for CHO ID 2, and MeasID3 for CHO ID 3). In one or more embodiments, the reconfiguration message comprises an indication that CHO ID 2 and CHO ID 2 each comprise a target MCG delta over the MCG of CHO ID 1.

In one or more embodiments, at operation 355, user equipment 120 transmits a radio resource control reconfiguration complete message to source master node 302. In one or more embodiments, the message comprises a confirmation of reconfiguration.

In one or more embodiments, at operation 360, there may be a circumstance where a CHO ID needs to be released. For example, a PSCell configured in a CHO configuration may not be feasible in terms of radio anymore. In another example, a PSCell configured in a CHO configuration may not be reserved for the user equipment. In one or more embodiments, in a circumstance where CHO ID 1 is to be released, CHO ID 2 and CHO ID 3 are first updated to full configurations. In one or more embodiments, the source master node 302 may only remove the execution condition for CHO 1, and other CHO configurations continue to reference CHO 1 as a reference configuration to obtain the full configuration. In one or more embodiments where the source master node 302 indicates that user equipment 120 should release the reference CHO configuration (e.g., CHO ID 1), the target MCG configuration within the reference CHO configuration is stored by, for example, the source master node 302 or user equipment 120, as the reference target MCG configuration. In one or more embodiments, in a circumstance where the source master node 302 indicates that user equipment 120 should release the reference CHO configuration (e.g., CHO ID1), a new reference target MCG configuration is indicated to the user equipment 120 by source master node 302. In one or more embodiments, a new delta configuration is indicated to the user equipment 120 by source master node 302.

In one or more embodiments, at operation 365, user equipment 120 monitors execution conditions of the CHO configurations.

In one or more embodiments, at operation 370, an execution condition for a CHO configuration (i.e., CHO ID 2) holds. In one or more embodiments, the CHO configurations are generated by applying the delta on top of CHO ID 1. In one or more embodiments, the MCG configuration of CHO ID 2 is applied as a delta on top of the MCG configuration of CHO ID 1.

In one or more embodiments, at operation 375, a random access channel is used between user equipment 120 and target master node 306.

In one or more embodiments, at operation 380, radio resource control reconfiguration occurs between user equipment 120 and target master node 306.

In one or more embodiments, at operation 385, target master node 306 (now source master node) confirms secondary node modification to candidate secondary node 308 (now source secondary now). In one or more embodiments, target master node 306 confirms radio resource control configuration complete to candidate secondary node 308.

In one or more embodiments, at operation 390, a random access channel is used between user equipment 120 and candidate secondary node 308.

Turning now to FIG. 4, an example flowchart is illustrated for a process 400 performed by an apparatus embodied by, associated with or otherwise in communication with (hereinafter generally referenced as being embodied by) a base station 140 to generate one or more other conditional handover IDs as deltas with regards to a first conditional handover ID, where the first conditional handover ID and the one or more other conditional handover IDs comprise a plurality of conditional handover configurations.

As shown in block 410 of FIG. 4, the apparatus embodied by the base station 140 includes means, such as the processing circuitry 220, the communication interface 260, or the like, for receiving a conditional handover request.

As shown in block 420 of FIG. 4, the apparatus embodied by the base station 140 includes means, such as the processing circuitry 220, the communication interface 260, or the like, for determining a plurality of configurations, wherein the plurality of configurations correspond to a single primary cell configuration. In one or more embodiments, the plurality of configurations comprise a plurality of master cell group configurations.

As shown in block 430 of FIG. 4, the apparatus embodied by the base station 140 includes means, such as the processing circuitry 220, the communication interface 260, or the like, for generating a first conditional handover configuration based on one of the plurality of configurations.

As shown in block 440 of FIG. 4, the apparatus embodied by the base station 140 includes means, such as the processing circuitry 220, the communication interface 260, or the like, for generating one or more other conditional handover configurations as deltas with regards to the first conditional handover configuration, wherein the first conditional handover configuration and the one or more other conditional handover configurations comprise the plurality of configurations. In one or more embodiments, the first conditional handover configuration comprises a first master cell group configuration, and wherein the one or more other conditional handover configurations comprise one or more other master cell group configurations generated as one or more deltas with regards to the first master cell group configuration. In one or more embodiments, first master cell group configuration comprises a delta configuration. In one or more embodiments, the first conditional handover configuration comprises a master cell group configuration and a secondary cell group configuration. In one or more embodiments, the apparatus embodied by the base station 140 includes means, such as the processing circuitry 220, the communication interface 260, or the like, for causing transmission of a conditional handover request acknowledgement, wherein the conditional handover request acknowledgement comprises the first conditional handover configuration, the one or more other conditional handover configurations, and an indication that the one or more other conditional handover configurations comprise deltas with regards to the first conditional handover configuration.

Turning now to FIG. 5, an example flowchart is illustrated for a process 500 performed by an apparatus embodied by, associated with or otherwise in communication with (hereinafter generally referenced as being embodied by) a base station 140 to update one or more other conditional handover IDs based on an update.

As shown in block 510 of FIG. 5, the apparatus embodied by the base station 140 includes means, such as the processing circuitry 220, the communication interface 260, or the like, for changing the first conditional handover configuration.

As shown in block 520 of FIG. 5, the apparatus embodied by the base station 140 includes means, such as the processing circuitry 220, the communication interface 260, or the like, for, based on the change, changing the one or more other conditional handover configurations.

Turning now to FIG. 6, an example flowchart is illustrated for a process 600 performed by an apparatus embodied by, associated with or otherwise in communication with (hereinafter generally referenced as being embodied by) a user equipment 120 to cause transmission of a reconfiguration confirmation based on a reconfiguration message.

As shown in block 610 of FIG. 6, the apparatus embodied by the user equipment 120 includes means, such as the processing circuitry 220, the communication interface 260, or the like, for receiving a reconfiguration message, wherein the reconfiguration message comprises a first conditional handover configuration, one or more other conditional handover configurations, and an indication that the one or more other conditional handover configurations comprise deltas with regards to the first conditional handover configuration.

As shown in block 620 of FIG. 6, the apparatus embodied by the user equipment 120 includes means, such as the processing circuitry 220, the communication interface 260, or the like, for causing transmission of a reconfiguration confirmation based on the reconfiguration message. In one or more embodiments, the apparatus embodied by the user equipment 120 further includes means, such as the processing circuitry 220, the communication interface 260, or the like, for, in a circumstance where an execution condition corresponding to one of the one or more other conditional handover configurations holds, applying the one of the one or more other conditional handover configurations, wherein a second conditional handover configuration is generated on top of the first conditional handover configuration based on the one of the one or more other conditional handover configurations.

Turning now to FIG. 7, an example flowchart is illustrated for a process 700 performed by an apparatus embodied by, associated with or otherwise in communication with (hereinafter generally referenced as being embodied by) a base station 140 to cause transmission of a reconfiguration message, wherein the reconfiguration message comprises a first conditional handover configuration, one or more other conditional handover configurations, and an indication that the one or more other conditional handover IDs comprise deltas with regards to the first conditional handover ID.

As shown in block 710 of FIG. 7, the apparatus embodied by the base station 140 includes means, such as the processing circuitry 220, the communication interface 260, or the like, for causing transmission of a conditional handover request.

As shown in block 720 of FIG. 7, the apparatus embodied by the base station 140 includes means, such as the processing circuitry 220, the communication interface 260, or the like, for receiving a conditional handover request acknowledgement, wherein the conditional handover request acknowledgement comprises a first conditional handover configuration, one or more other conditional handover configurations, and an indication that the one or more other conditional handover configurations comprise deltas with regards to the first conditional handover configuration. In one or more embodiments, the first conditional handover configuration comprises a master cell group configuration and a secondary cell group configuration.

As shown in block 730 of FIG. 7, the apparatus embodied by the base station 140 includes means, such as the processing circuitry 220, the communication interface 260, or the like, for causing transmission of a reconfiguration message, wherein the reconfiguration message comprises the first conditional handover configuration, the one or more other conditional handover configurations, and the indication that the one or more other conditional handover configurations comprise deltas with regards to the first conditional handover configuration.

As shown in optional block 740 of FIG. 7, the apparatus embodied by the base station 140 includes means, such as the processing circuitry 220, the communication interface 260, or the like, for receiving a reconfiguration confirmation based on the reconfiguration message.

As shown in optional block 750 of FIG. 7, the apparatus embodied by the base station 140 includes means, such as the processing circuitry 220, the communication interface 260, or the like, determining that UE should not execute a first conditional handover configuration, as a result not releasing the stored configuration from the UE and only removing an execution condition for at least one conditional handover configuration of the first conditional handover configuration and the one or more other conditional handover configurations. Through this enabling UE to apply delta on top of the first configuration to obtain full configuration for the second or further configurations.

As shown in optional block 760 of FIG. 7, the apparatus embodied by the base station 140 includes means, such as the processing circuitry 220, the communication interface 260, or the like, for storing a master cell group configuration associated with the first conditional handover configuration. Obtaining the full configuration for the second or further conditional handover configuration via applying the delta configuration on top of the stored master cell group configuration at the time of the conditional handover execution.

As shown in optional block 770 of FIG. 7, the apparatus embodied by the base station 140 includes means, such as the processing circuitry 220, the communication interface 260, or the like, for causing transmission of an indication to release the first conditional handover configuration. In one or more embodiments, the indication is transmitted only after receiving an indication from a user equipment that the one or more other conditional handover configurations can be generated without the first conditional handover configuration. In one or more embodiments, the indication is transmitted only after providing the user equipment with a new reference conditional handover configuration on top of which the user equipment can apply the one or more other conditional handover configurations. In one or more embodiments, an indication is provided to the user equipment that the one or more other conditional handover configurations should be updated with respect to the new reference conditional handover configuration.

As shown in optional block 780 of FIG. 7, the apparatus embodied by the base station 140 includes means, such as the processing circuitry 220, the communication interface 260, or the like, for causing transmission of an indication to release the first conditional handover configuration.

As shown in optional block 790 of FIG. 7, the apparatus embodied by the base station 140 includes means, such as the processing circuitry 220, the communication interface 260, or the like, for causing transmission of a message comprising a master cell group configuration and an indication that the one or more other conditional handover configurations comprise deltas with regards to the master cell group configuration. In one or more embodiments, the first master cell group configuration comprises a delta configuration. In one or more embodiments where a user equipment indicates support to generate a full conditional handover configuration, the user equipment will apply the one or more other conditional handover configurations as deltas on top of the master cell group configuration and store each of the one or more other conditional handover configurations.

FIGS. 4-7 illustrate flowcharts depicting methods according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 240 of an apparatus employing an embodiment and executed by a processor 220. As will be appreciated, any such computer program instructions may be loaded into a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded into a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising:

at least one processor; and at least one memory storing computer program code that, when executed by the at least one processor, cause the apparatus to at least perform:

receive a conditional handover request;

generate a first conditional handover configuration corresponding to a first target primary cell of a secondary cell group (PSCell); and generate one or more other conditional handover configurations as deltas with regards to the first conditional handover configuration, wherein each of the one or more other conditional handover configurations corresponds to (i) a same target primary cell (PCell) as the first conditional handover configuration and (ii) a different target PSCell than the first conditional handover configuration.

2. The apparatus of claim 1, wherein the apparatus is further caused to perform:

determine a plurality of configurations, wherein the plurality of configurations correspond to a single primary cell configuration and the plurality of configurations comprise a plurality of master cell group configurations.

3. The apparatus of claim 2, wherein the first conditional handover configuration comprises a first master cell group configuration, and wherein the one or more other conditional handover configurations comprise one or more other master cell group configurations generated as one or more deltas with regards to the first master cell group configuration.

4. The apparatus of claim 3, wherein the first master cell group configuration comprises a delta configuration.

5. The apparatus of claim 1, wherein the first conditional handover configuration comprises a master cell group configuration and a secondary cell group configuration.

6. The apparatus of claim 1, wherein the at least one memory storing computer program code is further configured to, with the at least one processor, cause the apparatus to:

cause transmission of a conditional handover request acknowledgement, wherein the conditional handover request acknowledgement comprises the first conditional handover configuration, the one or more other conditional handover configurations, and an indication that the one or more other conditional handover configurations comprise deltas with regards to the first conditional handover configuration.

7. The apparatus of claim 1, wherein the at least one memory storing computer program code is further configured to, with the at least one processor, cause the apparatus to:

change the first conditional handover configuration; and based on the change, change the one or more other conditional handover configurations.

8. An apparatus comprising:

at least one processor; and at least one memory storing computer program code that, when executed by the at least one processor, cause the apparatus to at least perform:

receive a reconfiguration message, wherein the reconfiguration message comprises a first conditional handover configuration corresponding to a first target primary cell of a secondary cell group (PSCell), one or more other conditional handover configurations, and an indication that the one or more other conditional handover configurations comprise deltas with regards to the first conditional handover configuration, and wherein each of the one or more other conditional handover configurations corresponds to (i) a same target primary cell (PCell) as the first conditional handover configuration and (ii) a different target PSCell than the first conditional handover configuration; and cause transmission of a reconfiguration confirmation based on the reconfiguration message.

9. The apparatus of claim 8, wherein the at least one memory storing computer program code is further configured to, with the at least one processor, cause the apparatus to:

in a circumstance where an execution condition corresponding to one of the one or more other conditional handover configurations holds, apply the one of the one or more other conditional handover configurations, wherein a second conditional handover configuration is generated on top of the first conditional handover configuration based on the one of the one or more other conditional handover configurations.

10. The apparatus of claim 8, wherein the first conditional handover configuration comprises a first master cell group configuration, and wherein the one or more other conditional handover configurations comprise one or more other master cell group configurations generated as one or more deltas with regards to the first master cell group configuration.

11. The apparatus of claim 10, wherein the first master cell group configuration comprises a delta configuration.

12. The apparatus of claim 8, wherein the first conditional handover configuration comprises a master cell group configuration and a secondary cell group configuration.

13. An apparatus comprising:

at least one processor; and at least one memory storing computer program code that, when executed by the at least one processor, cause the apparatus to at least perform:

cause transmission of a conditional handover request;

receive a conditional handover request acknowledgement, wherein the conditional handover request acknowledgement comprises a first conditional handover configuration corresponding to a first target primary cell of a secondary cell group (PSCell), one or more other conditional handover configurations, and an indication that the one or more other conditional handover configurations comprise deltas with regards to the first conditional handover configuration, and wherein each of the one or more other conditional handover configurations corresponds to (i) a same target primary cell (PCell) as the first conditional handover configuration and (ii) a different target PSCell than the first conditional handover configuration; and cause transmission of a reconfiguration message, wherein the reconfiguration message comprises the first conditional handover configuration, the one or more other conditional handover configurations, and the indication that the one or more other conditional handover configurations comprise deltas with regards to the first conditional handover configuration.

14. The apparatus of claim 13, wherein the at least one memory storing computer program code is further configured to, with the at least one processor, cause the apparatus to:

receive a reconfiguration confirmation based on the reconfiguration message.

15. The apparatus of claim 14, wherein the at least one memory storing computer program code is further configured to, with the at least one processor, cause the apparatus to:

remove an execution condition for at least one conditional handover configuration of the first conditional handover configuration and the one or more other conditional handover configurations.

16. The apparatus of claim 14, wherein the at least one memory storing computer program code is further configured to, with the at least one processor, cause the apparatus to:

store a master cell group configuration associated with the first conditional handover configuration; and cause transmission of an indication to release the first conditional handover configuration.

17. The apparatus of claim 13, wherein the at least one memory storing computer program code is further configured to, with the at least one processor, cause the apparatus to:

cause transmission of an indication to release the first conditional handover configuration; and cause transmission of a message comprising a master cell group configuration and an indication that the one or more other conditional handover configurations comprise deltas with regards to the master cell group configuration.

18. The apparatus of claim 13, wherein the first conditional handover configuration comprises a first master cell group configuration, and wherein the one or more other conditional handover configurations comprise one or more other master cell group configurations generated as one or more deltas with regards to the first master cell group configuration.

19. The apparatus of claim 18, wherein the first master cell group configuration comprises a delta configuration.

20. The apparatus of claim 13, wherein the first conditional handover configuration comprises a master cell group configuration and a secondary cell group configuration.

* * * * *